United States Patent [19]
Anaf et al.

[11] Patent Number: 5,631,067
[45] Date of Patent: May 20, 1997

[54] HETEROGENEOUS KNITTED FABRIC

[75] Inventors: Lieven Anaf, Waregem; Gabriël Dewaegheneire, Zwevegem, both of Belgium

[73] Assignee: N. V. Bekaert S.A., B-Zwevegem, Belgium

[21] Appl. No.: 351,374

[22] PCT Filed: Jun. 29, 1993

[86] PCT No.: PCT/BE93/00043

§ 371 Date: Dec. 13, 1994

§ 102(e) Date: Dec. 13, 1994

[87] PCT Pub. No.: WO94/01372

PCT Pub. Date: Jan. 20, 1994

[30] Foreign Application Priority Data

Jul. 1, 1992 [BE] Belgium .................................. 9200613

[51] Int. Cl.[6] .................................................. B32B 07/02

[52] U.S. Cl. .......................... 428/213; 428/212; 428/902; 442/312; 442/316

[58] Field of Search ..................................... 428/192, 193, 428/253, 254, 902, 212, 213, 297, 256, 298

[56] References Cited

FOREIGN PATENT DOCUMENTS

| | | |
|---|---|---|
| 0319298 | 6/1989 | European Pat. Off. . |
| 0438342 | 7/1991 | European Pat. Off. . |
| 0477785 | 4/1992 | European Pat. Off. . |

*Primary Examiner*—James J. Bell
*Attorney, Agent, or Firm*—Nixon & Vanderhye P.C.

[57] ABSTRACT

Heterogeneous custom knitted fabric for lining the surfaces of molds includes predetermined surface zones with different knitted patterns. The knitted fabric can be utilized in devices designed for the shaping of, for example, plates of glass.

22 Claims, 4 Drawing Sheets

HETEROGENEOUS KNITTED FABRIC

The invention relates to a heterogeneous custom made knitted fabric for lining the surfaces of molds.

In designing new models of vehicles more and more attention is being paid to the aerodynamic profile of the body, especially of the windshields and rear windows. These windows, therefore, are requiring curved plate shapes with increasingly more complex zones of curvature and with, for example, transitions from two to three-dimensional areas of curvature. The thermoshaping of the custom cut glass plates is carried out in a known manner by heating the flat glass plates to a temperature at which they become sufficiently pliable to be transformed in a mold with the desired curved surface into the desired curved window shape.

It is known, for example from the French patent application 2.606.398, to cover the surfaces of the hard metal mold with a lining layer that forms a cushion in order to avoid irregularities in the window surface during the thermoshaping. Fiber glass and metal wire fabrics, as well as combinations of the two, can be used for this purpose.

The demands being made on these liner fabrics continue to increase as a consequence of the necessity of creating ever more complicated curved surfaces in the glass plates. Insofar as parts of the liner fabrics extend over the edges of the mold or over zones with strong or three-dimensional curvature or over the remaining parts of the mold surface, their strength, wear resistance, transverse compressibility, bending resistance and/or extensibility in the surface will have to be adapted for each zone, area or part of the surface. On the concave side of the curved window, the window edges are increasingly being given a layer of colored enamel. With the thermoshaping process in the mold it is necessary to ensure that the enamel layer does not adhere to the knitted fabric edges situated opposite it. To accomplish this, the knitted fabric lining these edges may therefore require extra structural adaptations.

The invention contributes to solving this problem by providing a custom knitted fabric for lining mold surfaces; the fabric comprises thereby predetermined zones with different knitted patterns. The expression "knitted fabric comprising zones with, different knitting patterns" is to be understood here as a general concept for knitted structures in which at different places on the surface, and/or through the thickness of the fabric, the structure differs from the structure at other places by the difference in mesh size, mesh form, stitch pattern, mesh connection, fiber and/or yarn composition or structure and/or thickness of the knitted structure. As a result of these structural differences, therefore, both the fabric density (i.e. air permeability) or extensibility, resp. elasticity (in one or another direction) and either the strength or wear resistance, resistance to cutting, transverse compressibility (perpendicular to the surface of the fabric) and the stiffness will differ locally in relation to the neighbouring or bordering zones. The fabric density can further be adapted locally by a calendering operation at say between 100 and 200 bar.

This will now be further explained by means of the accompanying figures.

Figure 1:
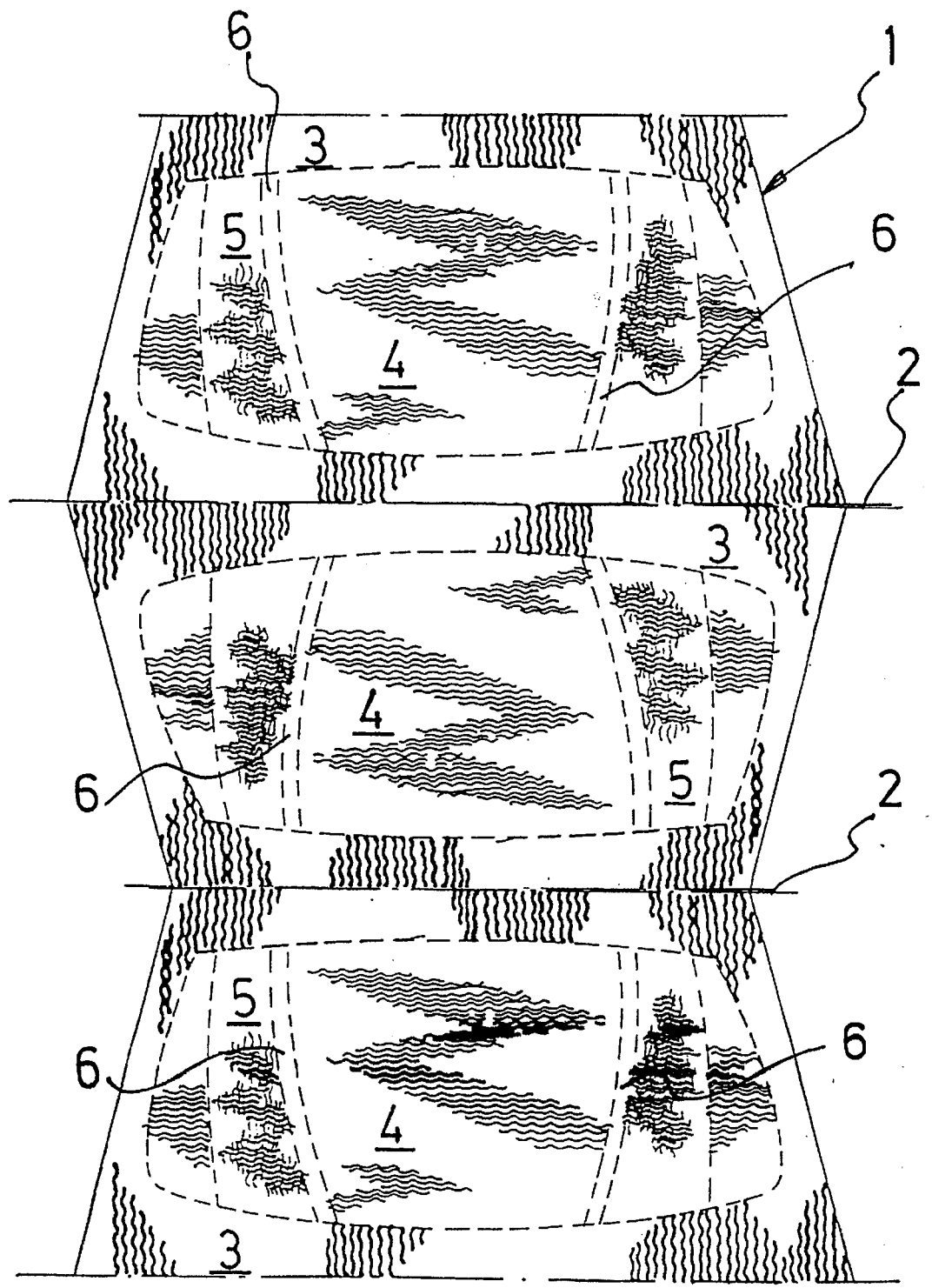
FIG. 1 shows a knitted fabric according to the invention with a number of consecutive knitted sections over its surface as they can be produced by the knitting machine.

Each of the consecutive sections of the knitted piece sketched in FIG. 1 forms a custom knitted fabric 1 for lining surfaces of a mold for the suitable bending of glass plates that are intended, for example, for windshields or rear windows of vehicles, and in particular for automobiles. In production, the knitted fabrics 1 run as consecutive sections out of, for example, a flat knitting machine. The sections can be attached to one another by means of one or more separation threads 2 that can easily be pulled out to separate the knitted fabrics from one another to be used as mold liners. The custom knitted fabrics 1 can also be produced one at a time (separate from one another).

Each knitted fabric 1 includes an outer peripheral zone 3 that serves mainly for fastening the fabric 1 over the edges of the mold. Its knitted pattern will also by preference be selected with a view to imparting a certain degree of stiffness along the edge of the knitted fabric so that it will have less tendency, if any, to roll up onto itself. This stiffness in one or more directions can, for example, be obtained by increasing the mesh density, by using a suitable stitch or stitch connection, by utilizing thicker and/or stiffer yarns, etc. The outer peripheral zone 3 will therefore usually be made stiffer than the enclosed zones 4, 5, and 6.

The central knitted fabric zones 4, 5 and 6 together constitute the part of the knitted fabric that lines or covers the actual molding surface and thus makes a kind of cushioned contact in the shaping (e.g. pressing) of the form cut glass plates. Depending on whether the degree of curvature over particular zones of the surface of the mold is more or less pronounced (e.g. two or three dimensional), the knitting pattern of the distinct zones 4 and 5 can differ from one another. The knitted areas or zones 5 facing the curved parts of the mold will by preference be knitted so as to be somewhat thicker and/or less permeable to air (denser) and/or more durable than the other zones 4. Density and/or thickness transition zones 6 between the two zones 4 and 5 are sometimes appropriate for preventing rib, wrinkle or crease effects in the knitted fabric. It can also be desirable to select a different—preferably higher—level of durability and/or transverse compressibility for the zones 5 than for the zones 4.

The various desired heterogeneities in the knitted fabric such as extensibility, elasticity, wear resistance, more or less softness to the touch, thickness, density, compressibility, stiffness, etc. can also be incorporated by adapting the yarn composition in each zone, possibly in combination with the measures described above for local adaptation of the knitting pattern. In the first place, we have to assume that the raw materials of the yarn for the knitted fabrics must be resistant to operating temperatures of, for example, more than 500° C. In principle, therefore, metal fibers and glass fibers, as well as ceramic and carbon fibers, are suitable.

It now appears that the knitted fabrics 1—at least in the zones where the highest level of durability is required—should by preference comprise metal fibers, e.g. stainless steel fibers. These steel fibers will by preference have a thickness of between 6 µm and 30 µm. They can be produced utilizing a bundled drawing method, such as is known, for example, from U.S. Pat. Nos. 2,050,289 or No. 3,379,000. Subsequently they can be spun into multifilament or staple fiber yarns (whether or not doubled) with a metric number of between 5 and 60 in view of the later knitting process. If so desired, the metal fibers can be mixed beforehand with a certain ratio of other heat-resistant fibers such as, for example, glass fibers, in order to incorporate one or another mixed yarn composition into one or another of zones or areas 3 to 6 for the purpose, for example, of meeting specific heat conductivity requirements.

Figure 4:
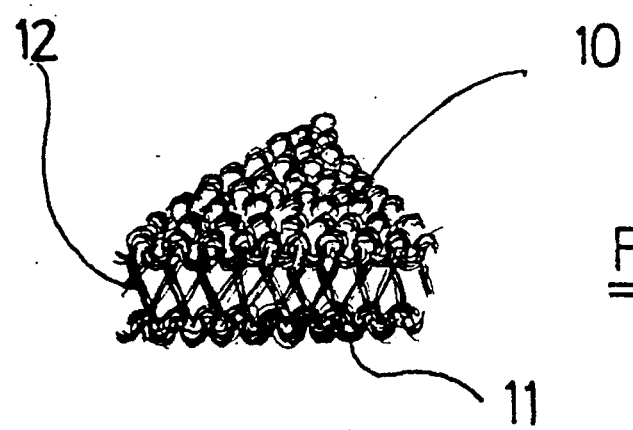
FIG. 4 is a cross-section of a double-layered section of knitted fabric in which the knitting pattern differs through the thickness of the fabric, i.e. from the one layer to the other.

It can also be appropriate to knit zones 3 and possibly 4 completely out of (less expensive) glass fiber yarns and, for example, the less air permeable zones 5 (and 6) out of the usually more expensive metal fiber yarns. The composition of the yarns per zone will ultimately have to be adjusted experimentally to the anticipated local loading conditions (temperature, pressure, abrasion, etc.) on the knitted fabric zones. Zones 3 and 4 can consist exclusively of glass fiber, while zones 5 and 6 can contain a hybrid mixture of glass and metal fibers. One can even consider producing zones 3 and/or 5 as double-knitted layers in order to counteract the possible tendency of single-layer knitted fabrics so roll up. Such a double-knitted section is shown in cross-section in FIG. 4. Both layers 10 and 11 of the double-knitted piece can then differ from one another in terms of knitting patterns: i.a. with respect to stitch density and/or fiber composition (e.g. glass on the one side and metal on the other side). The two outer layers 10 and 11 are mutually joined to one another during knitting with binding threads 12. Naturally, the composition of the knitted fabric should also be chosen such that at the pressure temperatures in the mold it does not adhere to enamel paints that may possibly be applied to the window surfaces. If desired, aramid fibers or other temperature resistant synthetic fibers can be inserted as well. Long metal fibers, obtained by a shaving process as described e.g. in EP 319.959 can be used as well.

Figure 2:
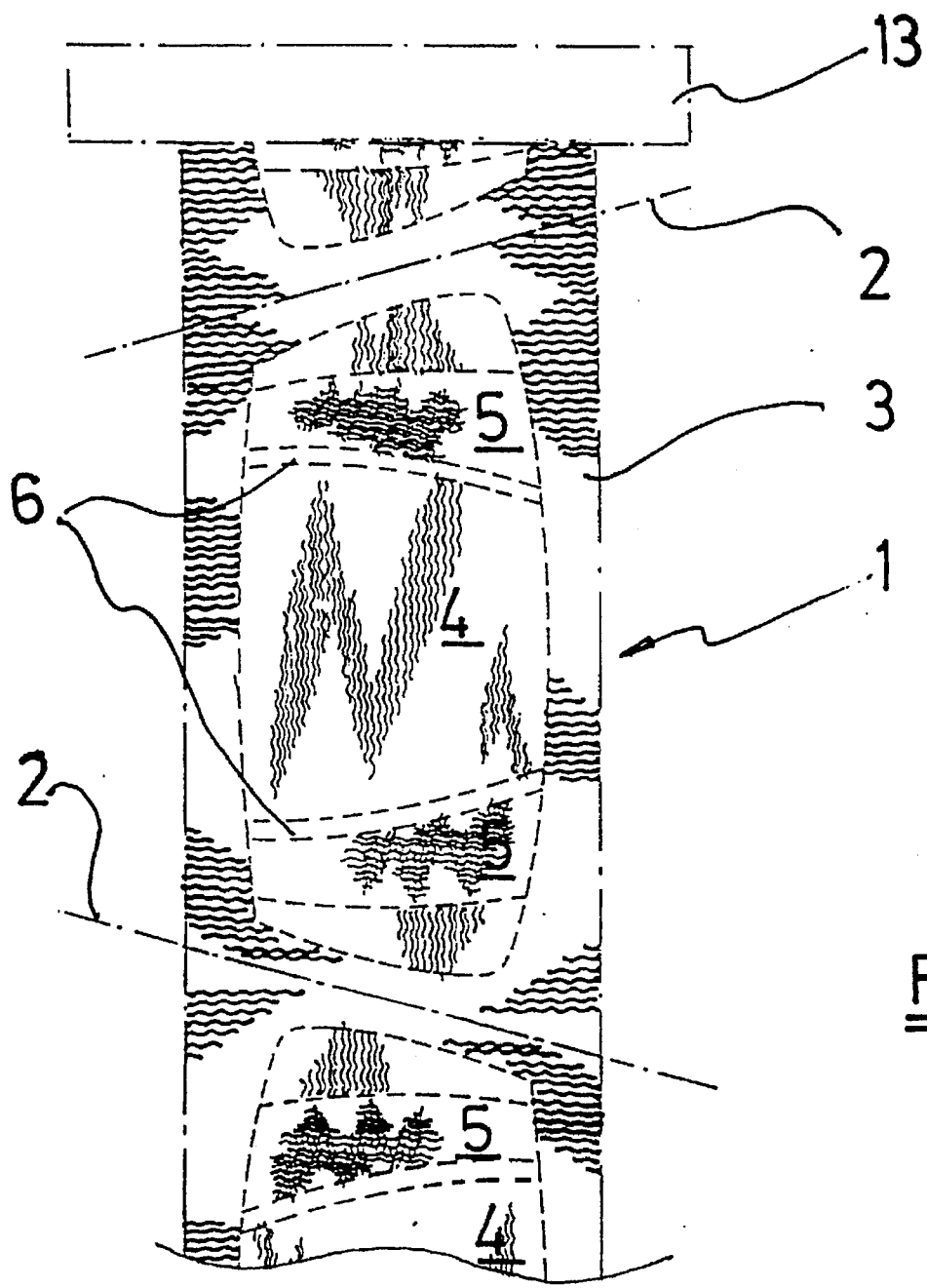
FIG. 2 shows a similar knitted fabric in which the consecutive sections produced by the machine are arranged differently.

FIG. 2 shows a similar knitted fabric. The sections 1 with separation threads 2 in between are arranged otherwise in this case. Depending on how the parameters of the knitted fabric need to be varied during the knitting process, this pattern may be chosen in preference to that in FIG. 1.

It is obvious that it can be appropriate to utilize a different knitting pattern in mold presses for the lining of the female mold form than for the male. The female mold form may be just a frame facing the peripheral edges of the male part of the mold.

Figure 3:
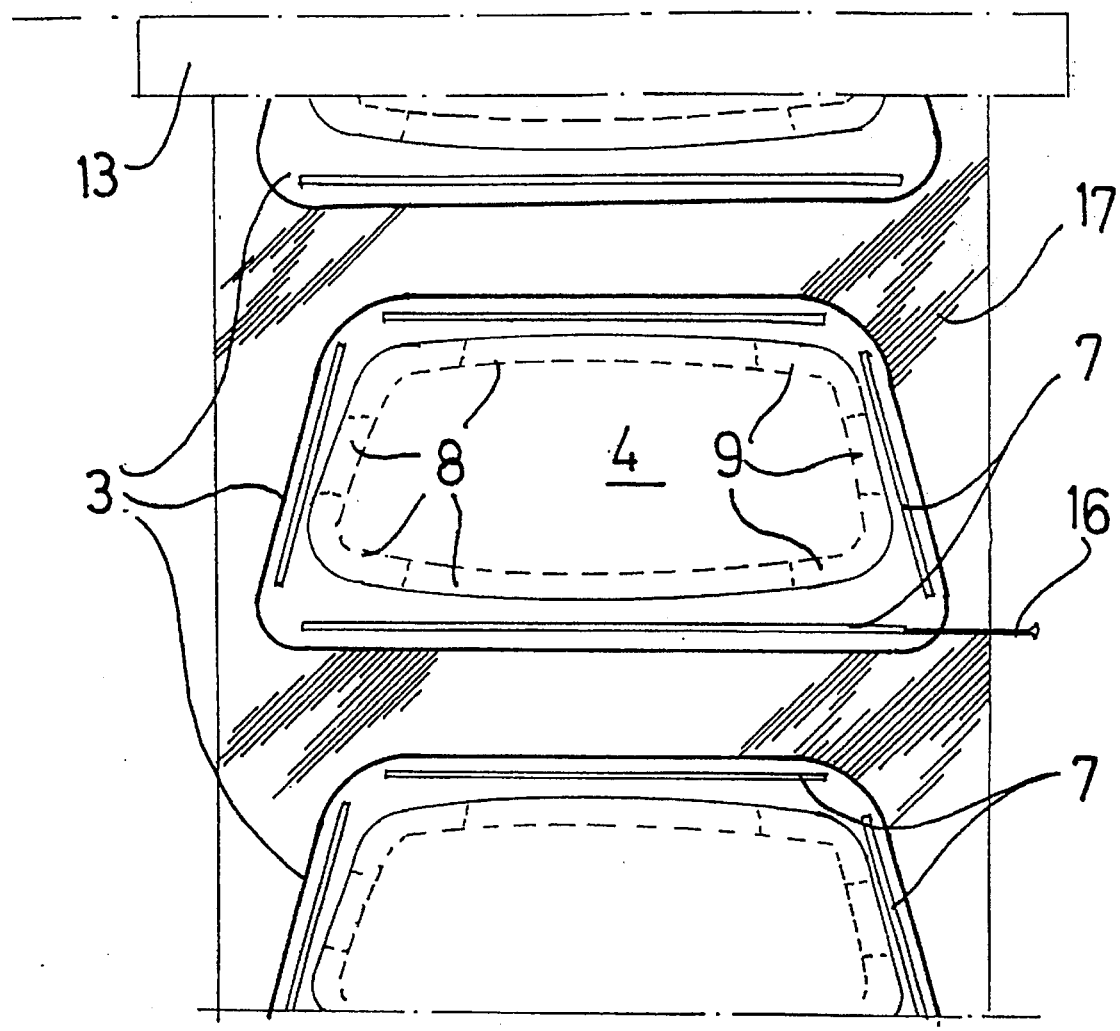
FIG. 3 shows schematically a custom flat knitted fabric for shaping a windshield or rear window of an automobile.

The embodiment according to FIG. 3 shows a border area 3 for attachment to the mold edge of a male mold. In flat knitting with, for example, a CMS machine 440 (Stoll, Reutlingen) it is possible to knit a tube-shaped strip 7 into this border area. A straight yet flexible reinforcement wire 16 can be inserted into this tube cavity—a wire made, for example, of soft stainless steel or copper—in order to prevent the rolling up of the fabric section. These edge ribs 7 that have been reinforced or rigidified in this manner can also be used to attach the knitted fabric sections in a handy way to the mold borders using hooks, for example.

In the central area 4 (with relatively small curvature) the window must possess a perfectly flawless optical quality. Knitted fabric structures composed of stainless steel fiber yarns (e.g. 316L) of approximately 10 μm fiber diameter (e.g. between 6 and 15 μm) or of glass fiber yarns, are satisfactory here. A fabric thickness of, for example, 1.2 mm (and preferably at least 1.0 mm) in the thinnest zones and an air permeability of preferably between 2000 and 6500 l/h at a pressure gradient of 100 Pa over the fabric have been found to be suitable.

During shaping, the zones 8 and 9 face the edges of the window that are covered with enamel and are usually subjected to a greater loading stress (pressure, abrasion, shearing forces) than the central zone 4. Therefore the knitted pattern and the composition of fibers and yarns must be adapted to these circumstances, and in particular to the higher standards of durability. The fiber diameter will by preference be selected to be thicker than the one utilized for zone 4. During production of the yarns and knitting fabrics, lubricating steps involving the use of oil are carried out, and this oil must be thoroughly washed out before bringing the knitted fabric into contact with the mold. Small residues of oil on the fabric, however, are difficult to avoid. These residues, however, must not be allowed to give rise to excess brittleness in the fibers (either within zone 4 or around it) as a result of the formation of carbon residues and oxidation at the high shaping temperature. The fiber composition will therefore have to be adapted. Stainless steel fibers with a relatively low ratio of iron to chrome and nickel content therefore take preference: e.g. at least 16% Cr and at least 10% Ni, sometimes even more than 17% Cr and at least 12% Ni or fibers of the type 347. Metal fibers of Inconel (type 601) or of 80% Ni and 20% Cr are also suitable.

The parts of the mold that are covered with knitted fabric can also be designed in view of the tempering or the combination of processes of shaping and subsequent tempering of the windows thus shaped while they continue to be supported by mold parts covered with knitted fabric.

In order to be able to utilize fibers with very durable, wear resistant or corrosion-resistant surfaces, one can consider coating the fibers (in particular the stainless steel fibers) through the use of plasma sputtering, for example, with a thin wear-resistant layer such as tungsten carbide, titanium nitride, hard chrome, aluminum titanate, $(AlN)_5$ $(Al_2 O_3)_9$ or a NiAl alloy or Inconel.

The knitted fabric concept according to the invention makes it possible, in particular, to utilize custom knitting patterns that are suitable for the lining or covering of molds, such as is described in the following European patent applications (EP). In EP 404.677 a concept according to the invention can replace the combination of the flexible membrane (22) and the PTFE foil (26) resp. of the metal fabric (16) with the elastic SIGRAFLEX layer. In the circulating belt (13) in EP 415.826 or EP 392.886 the side edges can according to the invention comprise a reinforced knitting pattern, while various patterns next to each other can be incorporated into the surface and/or the thickness of the central zone of the belt.

The utilization of custom knitted fabric patterns can also be useful when windows are to be shaped having strongly curved edges as described, for example, in EP 445.672, EP 351.739, EP 389.323, EP 373.992, EP471.621 and EP 414.232. Compared to the zones with strong curvature, then, the knitted pattern in the zones with lesser curvature will usually be less flexible. Similar adaptation of knitting patterns can also be contemplated in window shapes having both a convexly bent part and a concavely bent part, as described in EP 423.698, EP 448.960, EP 476.693 and U.S. Pat. No. 4,508,556 or U.S. Pat. No. 4,260,409. The knitted patterns on the lower and upper surfaces of the fabric can, for example, be interchanged between the convex part and the concave part, possibly with a transition zone in between.

For the stitch pattern a gauge of between 10 and 18 can be utilized. The knitted fabrics can also be provided with an appropriate pattern of holes, whether regular or differing from one zone to another, for the purpose of adapting the heat transfer between mold and glass plate in terms of, among other things, the system of blowing or suctioning a stream of hot or cold air during shaping or tempering.

The knitted fabric can also have the form of a flat ring with an oval, square or other outside contour. The inside contour or periphery can then have either the same or a different form.

EXAMPLE

For a rear window of a five-door automobile the trapezoid-shaped knitting pattern 1 with distinct surface zones 3,4 and 5 is utilized as sketched in FIG. 1. In the zones 3 and 5 the same knitting pattern F1 or F4 is used, and in the zone or patch 4 the pattern F2 or F3 is used.

Only stainless steel fiber yarns (type 316L with, for example, something like 17.5% Cr and 12% Ni) are utilized in all knitting patterns F1 to F4. The fiber diameter here is 8 μm but can also be 12 μm, at least for zones F1 and/or F4. The yarns have a metric number of, for example, 11/2 and comprise two strands that are twisted together. The yarns are processed into knitted fabric on a flat knitting machine of the CMS 440 type (Stoll G.m.b.H.—Reutlingen) with a gauge of 12.

In the table below a few parameters for knitted fabrics are summarized:

TABLE 1

| type | weight g/m² | thickness mm | permeability l/h at 100 Pa | number of filling yarns | stitch pattern |
| --- | --- | --- | --- | --- | --- |
| F1 | 1224 | 1.60 | 3100 | 1 | 1/4 |
| F2 | 1268 | 1.30 | 3200 | 1 | 1/3 |
| F3 | 1198 | 1.25 | 2900 | 2 | 1/2 |
| F4 | 1699 | 1.85 | 2900 | 3 | 1/3 |

Figure 5:
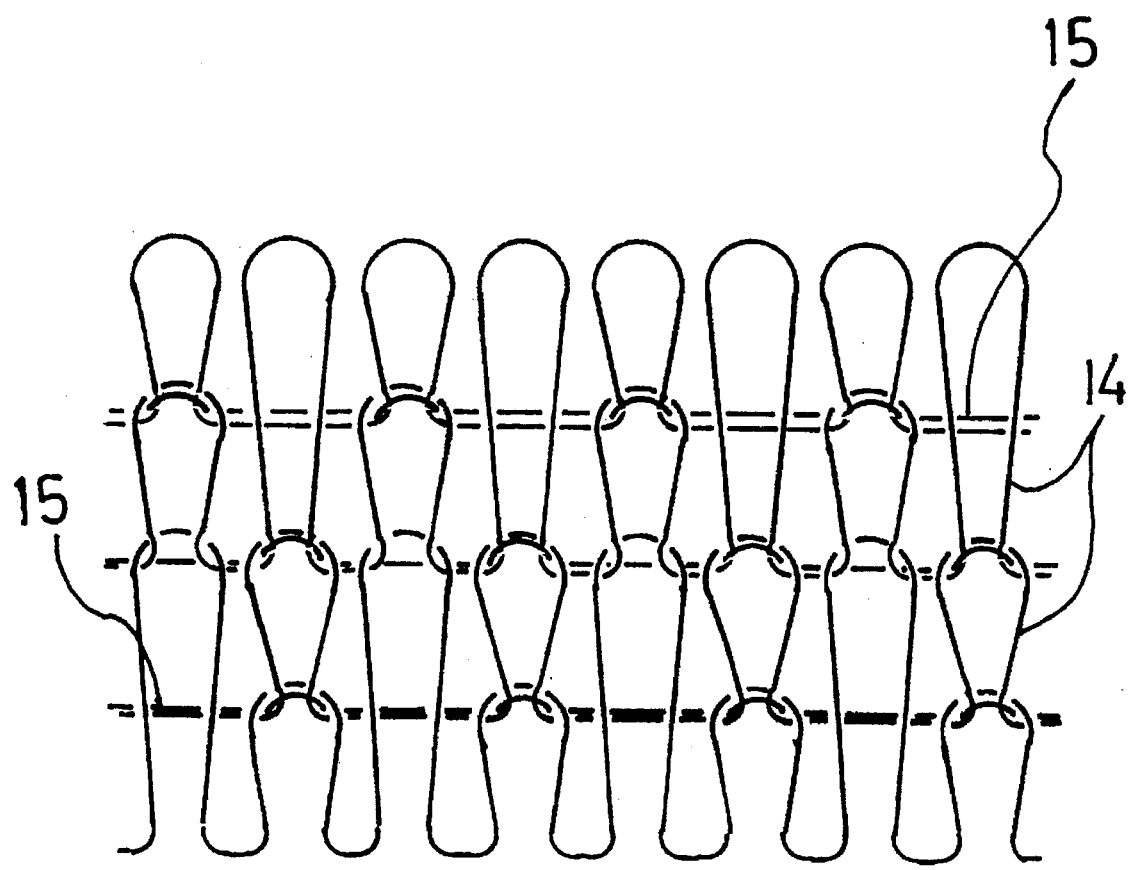
FIG. 5 shows schematically a knitting pattern with filling yarns.

In FIG. 5 an example of a knitted fabric is schematically illustrated that can be produced on a CMS 440/Stoll flat knitting machine and that is analogous with the fabrics that are listed in the table above. Every two needles a yarn 14 is knitted in; this is then indicated by a stitch pattern of ½. In addition, one filling yarn 15 is worked into each row. This filling yarn 15 takes on something approaching a pile loops pattern on one side of the fabric and thus imparts a certain cushioning effect to the knitted fabric. In accordance with the circumstances during the shaping process, the fabric can lie with its pile loops side either against the glass plate or against the surface of the mold. With a double-layered knitted fabric (FIG. 4) filling yarns 15 can be incorporated into at least a part of the rows of the knitted fabric of both layers.

Weft yarns can also be knitted into the knitted fabric. This will then usually have the effect of making the knitted fabric much less extensible in this weft direction than in the direction perpendicular to it. By then stretching the fabric in a controlled manner when pulling it over the mold form the fabric density can be regulated in this one direction, while in the weft direction it remains constant.

For the rear window of an automobile a knitted pattern according to FIG. 3 can also be used. Zone 3 can be knitted out of glass fiber yarns. The knitted fabric types F1 and/or F4or double-layered knitted structures can be utilized in the central zone 4. The following pattern combinations (among others) can thus be composed:

TABLE 2

| Zones | | | | | | |
| --- | --- | --- | --- | --- | --- | --- |
| 4 | F2 | F3 | F2 | F3 | F2 | F3 |
| 3 | glass | F1 | glass | F1 | F1 | glass |
| 8 | F1 | F1 | F4 | F1 | F4 | F4 |
| 9 | F1 | F4 | F4 | F1 | F4 | F4 |

In order to avoid knitting difficulties with specific patterns in the transition between two consecutive sections, a knitted transition fabric border 17 can be provided made of, for example, inexpensive and easy to process yarns such as cotton. The consecutive sections can then be separated from one another by cutting the fabric in this cotton yarn zone 17.

The invention is applicable not only for the bending of automobile windows, but also for other shaping of glass objects by means of pressing in molds, e.g. for the shaping of cathode ray tubes and curved mirrors.

We claim:

1. Custom knitted fabric for covering mold surfaces comprising predetermined surface zones having different knitting patterns.

2. Knitted fabric according to claim 1, in which the different knitting patterns are present in predetermined zones through the thickness of the knitted fabric.

3. Knitted fabric according to claim 1, in which particular zones over its surface are thicker than the bordering zones.

4. Knitted fabric according to claim 3, in which a gradual thickness transition is present in a border zone (6) between thicker zones (5) and thinner zones (4).

5. Knitted fabric according to claim 1, in which particular zones over its surface are more compressible in the transverse direction than others.

6. Knitted fabric according to claim 1, in which particular zones over its surface are either more extensible or more elastic than others.

7. Knitted fabric according to claim 1, in which the outer peripheral or contour zone possesses a greater stiffness than the zones over the central part of the knitted fabric surface.

8. Knitted fabric according to claim 1, in which particular zones are more wear resistant than others.

9. Knitted fabric according to claim 1, in which particular zones are less permeable to air than others.

10. Knitted fabric according to claim 1, in which the fiber composition differs between one or more zones and others.

11. Knitted fabric according to claim 1, in which the yarn composition differs between one or more zones and others.

12. Knitted fabric according to claim 1, which in at least one zone comprises yarns containing metal fibers with a diameter of between 6 μm and 30 μm.

13. Knitted fabric according to claim 12, composed of metal fiber yarns in which the metal is a type of stainless steel.

14. Knitted fabric according to claim 13, in which the stainless steel contains at least 16% Cr and at least 10% Ni.

15. Knitted fabric according to claim 13, in which the fibers possess a wear-resistant coating layer.

16. Knitted fabric according to claim 1, in which filling yarns are knitted into at least one zone.

17. Knitted fabric according to claim 9, in which the permeability of the zones lies between 2000 and 6500 l/h at a pressure gradient of 100 Pa over the fabric.

18. Knitted fabric according to claim 1, in which the thinnest zones are at least 1.0 mm thick.

19. Knitted fabric according to claim 1, which is provided with a suitable pattern of holes.

20. Knitted fabric according to claim 1, with a stitch gauge of between 10 and 18.

21. A layered knitted fabric for covering mold surfaces which includes two layers and predetermined surface zones having different knitting patterns, and at least one of said layers is made of metal fiber yarns.

22. A layered knitted fabric as in claim 21 wherein the metal fibers of said yarns have a diameter of between 6 μm and 30 μm.

* * * * *